Oct. 12, 1937.  W. C. CORYELL  2,095,733
METAL ROLLING
Filed Oct. 6, 1933  3 Sheets-Sheet 1

Inventor
William C. Coryell
By Thomas H. Ferguson
Attorney

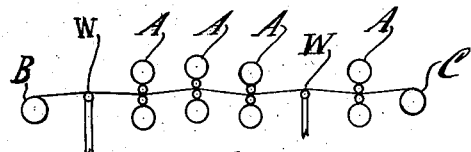
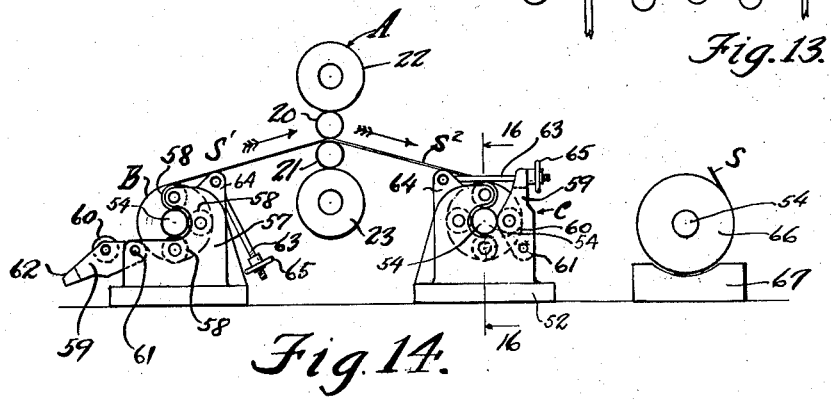
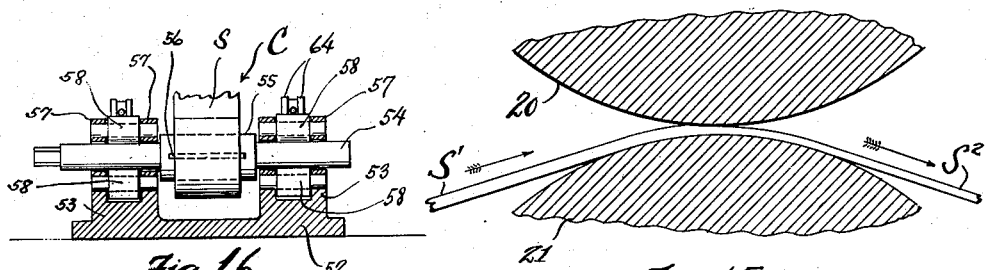
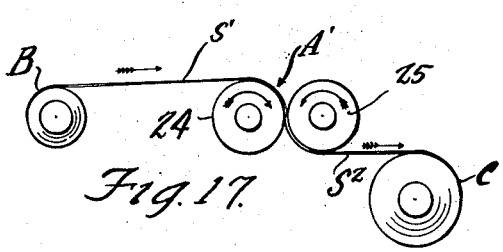
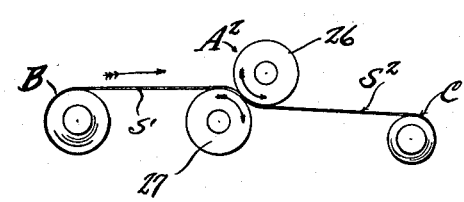
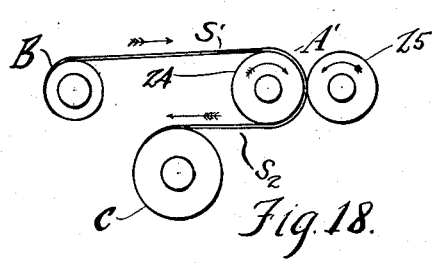

Inventor
William C. Coryell
By Thomas H. Ferguson
Attorney.

Patented Oct. 12, 1937

2,095,733

UNITED STATES PATENT OFFICE 2,095,733

METAL ROLLING

William C. Coryell, Youngstown, Ohio

Application October 6, 1933, Serial No. 692,494

20 Claims. (Cl. 80—31.1)

The present invention relates to metal rolling and has to do more particularly with the manner of feeding the work into the mill pass.

The invention has utility in the handling and control of other forms of metal work than metal strip, but inasmuch as the invention has been conceived and worked out in connection with the cold rolling of strip it will be described particularly in that connection. The term "strip" is therefore used herein, in both the specification and claims, in a generic sense.

One object of the invention is to provide for the feeding of the strip into the pass of the mill without the use of clamps or edge guides such as have been heretofore commonly employed. According to prior practice the strip enters and leaves the pass of the mill on a level so that the point of tangency of the strip on the rolls is at the pass. The piece is in contact with either roll substantially only at the pass. With this travel of the strip in this substantially tangential plane edge guides suffice to keep the strip centered in the pass and clamps acting above and below the strip hold it in a more or less flat condition for entry into the pass.

In contrast to this, I feed the strip into the rolls with a suitable tension in the strip and at the same time wrap the strip slightly about a small portion of one of the rolls and keep it so engaged with the same roll throughout the passage of the strip. The tension is on the feeding side and is of a sufficiently high order to hold the strip flat against the body of the roll as it approaches the pass. Thus the strip is drawn so as to press firmly against the cylindrical surface of the roll throughout a considerable arc. The effect is to present the strip to the reducing area of the pass in a flat condition at all times.

This means that all parts of every transverse element of the strip are in perfect transverse alignment as they approach the pass and enter it. The new method therefore accomplishes all of the results obtainable with clamps and guides and does so in a simple and more ideal way and without the use of either of the old devices.

In furtherance of the aforesaid object, I also provide for the centering of the strip in the pass in a novel way. As before indicated this centering has been commonly accomplished heretofore by the use of edge guides. These, however, are quite inefficient and often become badly cut, especially when the strip is quite thin. Usually a soft metal such as brass or soft steel is used for edge guides since a very hard guide may damage the strip. By my new method the centering of the strip is brought about by tilting the strip to the right or left so as to warp it just as it enters onto the surface of the roll. This warping action may be produced by deflecting the strip through more or less of its width. The deflecting action moves the deflected portion out of the plane of travel which it would occupy if allowed to travel freely. Perhaps in its simplest form the warping is produced by deflecting one edge of the strip out of this normal plane. If the strip is to be moved to the left, the right hand edge of the ingoing portion is deflected. If it is to be moved to the right, then the left hand edge of the strip is deflected. Thus by proper manipulation the strip can be shifted to and fro lengthwise of the reducing rolls and thus centered in the pass and maintained more or less accurately in a central position.

These different objects and advantages of the invention may be accomplished in various ways but preferred embodiments are presented herewith in the accompanying drawings and fully disclosed in the following detailed description while the scope of the invention is particularly pointed out in the appended claims.

In said drawings, Fig. 1 is a diagram of a two-reel reversing mill with fixed guides arranged to lift the strip and cause it to wrap while under tension about a portion of the under side of the top working roll, all in accordance with the wrapping feature of the invention, previously mentioned.

Fig. 13 is a view similar to Fig. 12 illustrating the wrapping feature in a continuous mill wherein the mill stands are offset or staggered in elevation with reference to each other.

Figure 1:
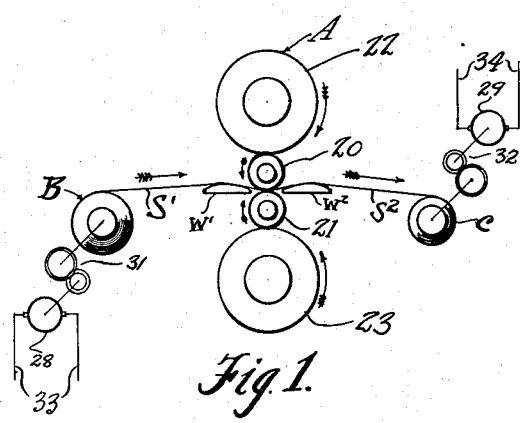
Figure 3:
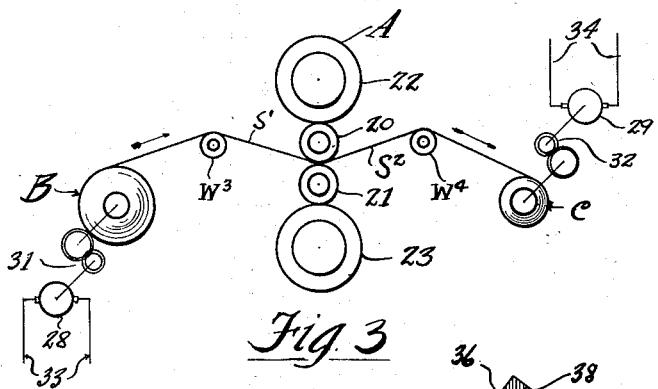
Fig. 3 is also a diagram illustrating a two-reel reversing mill similar to that of Fig. 1 but provided with guide rollers which are operated to give the wrap previously mentioned and also by the tilting of the rollers to give the necessary warp to the strip to cause it to creep longitudinally of the rolls of the mill.

Fig. 14 illustrates a mill of the type shown in Figs. 1 and 3 provided with novel bearings for the reel shafts constructed in accordance with the third feature of the invention, divided out of this case and presented in my application Serial No. 151,338, filed July 1, 1937, the shaft at the right being held in operative position by movable roller supports and the shaft at the left having the movable roller supports open in readiness for the withdrawal of the shaft.

Fig. 15 is an enlarged view illustrating a strip as it goes through the pass of the mill of Fig. 14, the rolls being shown in section.

Fig. 16 is a transverse section of the reel of Fig. 14, the plane of section being indicated by the line 16—16 of Fig. 14.

Fig. 17 illustrates a modified arrangement by which the wrapping feature of the invention may be practiced, an arrangement wherein the working rolls are in a horizontal position.

Fig. 18 illustrates a further modification wherein the working rolls are in the same relation as in Fig. 17 but the reels are located both at the left instead of one at the left and one at the right as in Fig. 17.

Fig. 19 is a similar view illustrating the working rolls in an oblique position with reference to the direction of travel of the work.

Figures 5, 6, 10:
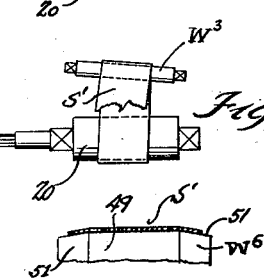
Fig. 5 is a fragmentary view illustrating a modified controlling roller.
Fig. 6 is a detailed sectional view of the structure of Fig. 4, the plane of section being indicated by the line 6—6 of Fig. 4.
Fig. 10 is a fragmentary view similar to Fig. 5 illustrating a further modification of the shape of the guide roller.
Figure 20:
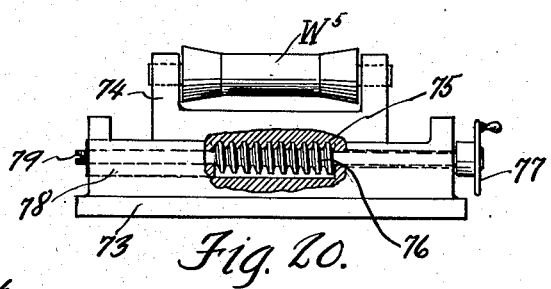

Fig. 20 illustrates mechanism for laterally shifting a roller of the type shown in Fig. 5.

Figure 21:
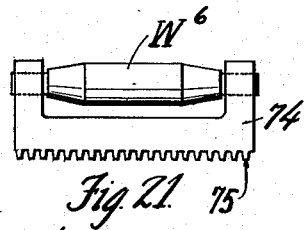

Fig. 21 shows in a similar view a mounting for a roller of the type shown in Fig. 10.

Figures 22, 23:
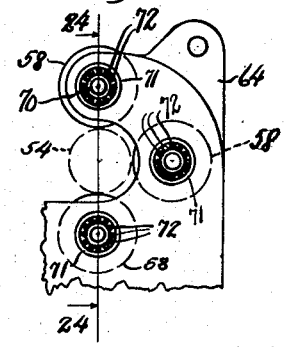
Figure 24:
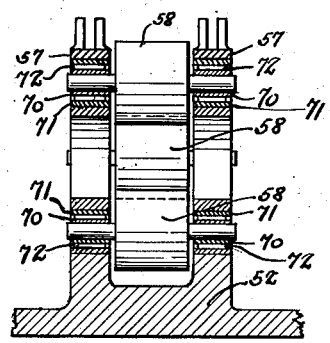

Figs. 22, 23 and 24 illustrate details of the roller bearings provided, as illustrated in Fig. 14, for the reel shafts, Fig. 24 being a partial sectional elevation, the plane of section being indicated by the line 24—24 of Fig. 23.

Figure 25:
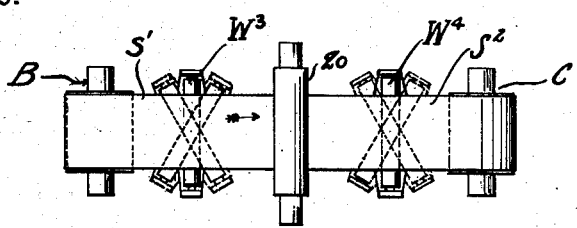

Fig. 25 is a diagrammatic plan view of a strip and associated reel and mill parts in association with warping rolls which oscillate upon a vertical pivot.

Figure 26:
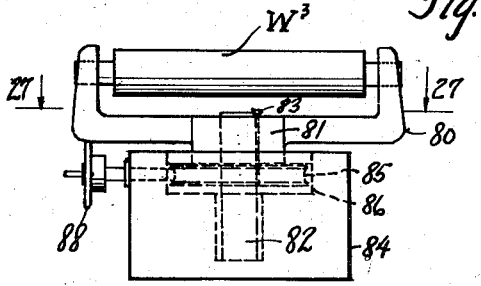
Figure 27:
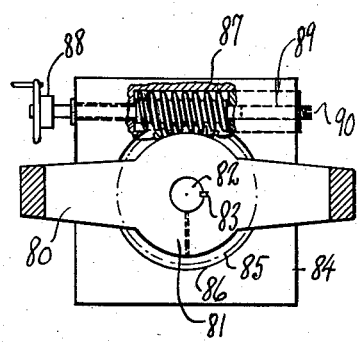

And Figs. 26 and 27 show in elevation and partial sectional plan, respectively, a suitable mounting for these guide rollers which are arranged to oscillate upon a vertical axis, the plane of section of Fig. 27 being indicated by the line 27—27 of Fig. 26.

Throughout these views like characters refer to like parts.

Referring to the drawings in detail, the mill which is employed in the practice of my invention may take different forms. In certain illustrated embodiments I have shown a four-high mill A having small diameter working rolls 20, 21 and large diameter backing up rolls 22, 23 while in other illustrations I have shown the usual two-roll mill $A^1$ having its rolls 24, 25 arranged horizontally, or the similar mill $A^2$ having the plane of the axes of its rolls 26, 27 inclined to the general direction of travel of the strip. These mills will be of the usual construction as to housings, screwdowns, and the like, and it is to be understood that the drawings illustrate them only diagrammatically. These mills may also be driven in any preferred way as by the use of motors or other power devices, or they may be rotated by the pull of the strip as the latter is drawn forward by the coilers.

The coilers B, C associated with the various mills are diagrammatically shown for the most part. In the operations upon the strip, which move the strip in the directions indicated by the arrows in the several diagrams, the coilers B are the unwinding coilers and the coilers C are the receiving or winding up coilers. The reels of these coilers are also preferably driven by electric motors, the motors 28 being associated with the coilers B and the motors 29 with the coilers C. These motors with their interconnecting shafting and gearing 31, 32 are all shown diagrammatically and may be constructed and controlled in any desired way. The conductors 33, 34 furnish the current to the motors 28, 29, respectively.

In operation the strip will be carried from the coiler B through the mill to the coiler C until the latter is filled and then the direction of operation is reversed and the coiler which was previously unwinding now becomes a winding coiler. This reversal of the mill continues with proper mill adjustments until the strip is brought to its final dimensions and condition. Then the reel and shaft bearing the finished product is removed and a new shaft and reel containing a new coil of strip to be treated is put in place and the operations continued. Where such operations are performed with the motor arrangement illustrated, obviously the motor on the winding coiler will be supplied with current and driven while the motor associated with the unwinding coiler will have its circuit open and run idle or it will be controlled in some other desired way. In my prior Patent No. 1,892,934, granted January 3, 1933, I have shown a control for the electric motors which might be utilized in the present case.

All of these parts, as before indicated, are old and may take many different forms and therefore not be set forth with more particularity.

Coming now to the novel features of the invention and considering more particularly at first the wrapping feature, it will be noted that fixed guides $W^1$, $W^2$, in the form of the invention illustrated in Fig. 1, are elevated with reference to the mill pass so as to lift the strip and thus wrap it about an arcuate portion of the roll 20. This is shown more clearly in Fig. 2 where the parts are drawn on a larger scale. As there shown, the portion of the strip which lies to the left and is on the entering or feeding side of the pass of the rolls 20, 21, is designated $S^1$ while that portion of the strip which has been reduced in size or otherwise treated by reason of the action of the rolls 20, 21, is designated $S^2$. This way of designating the portions of the strip will be followed throughout the several views.

Figure 2:
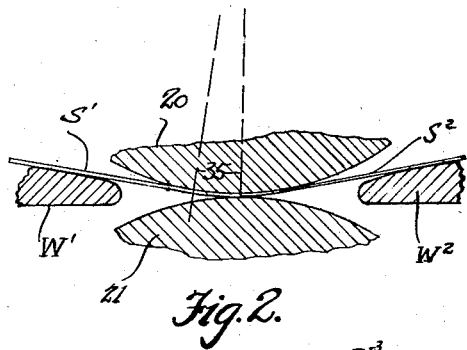
Fig. 2 is an enlarged view, partly in section, illustrating more clearly the way in which the strip is wrapped about the upper working roll of the mill of Fig. 1.

From an inspection of Fig. 2 it will be seen that the contact of the strip with the lower roll 21 occurs only at the reducing area and is quite small compared with the contact of the strip with the upper roll 20. It is important to note that the directing of the strip into the pass is important only on the feeding in side. The reason that two guides W¹, W² are shown is that the mill is a reversing mill and thus the guides are alternately brought into play as controlling devices having to do with the feeding of the strip. The enlarged views, Figs. 2 and 15, show quite clearly how the wrap of the strip around the rolls, whether the upper roll of Fig. 2 or the lower roll of Fig. 15, when combined with suitable tension holds the strip very securely in flattened position as it enters the pass. This tension may be as high as that employed in stretch rolling, according to my prior Patent No. 1,618,515, dated February 22, 1927, or it may be relatively low. In any event, it must be appreciable, that is to say, a tension more than slight or trivial. A trivial tension would not wrap the edge of the strip so as to cause it to travel helically along the reducing roll. On the other hand, an appreciable tension would do this. Obviously, the appreciable tension must be measured relative to the compression used. Again, with soft metals the compression and tension values would be small relative to those required upon hard metals. Yet, in each case, the tension measured in terms of compression would be appreciable, not slight or trivial.

Considering the portion S¹ of the strip, it will be seen that it is engaged by the guide W¹ and because of the elevated position of the latter relative to the tangential plane through the pass, which plane, in the case illustrated, is horizontal, the portion S¹ is wrapped about a small arc of the roll 20 on the feeding in side of the pass. At the same time the coiler B must be acted upon by the braking action of the motor 28, or by any of the well known retarding means heretofore commonly employed, in order to place a high tension in the strip portion S¹. The pull on the strip with the parts in the relation illustrated causes the strip to be flattened out against the face of the roll 20 and thus it presents itself in flat condition to pass into the reducing area between the rolls.

As illustrated in Fig. 2, it will be seen that the distance 35 is approximately the peripheral length of the face against which the strip portion S¹ is pressed during the flattening operation. Although using the words "flat", "flattening" and the like, it will be understood that the portion of the strip passing over the face 35 will really be in one direction arcuate with a radius equal to that of the roll. In the other direction, however, that is to say, the direction transverse to the direction of travel of the strip, each element of the strip as it presents itself will be in true transverse alignment and there will be no upturned edges, buckles or other irregularities in the strip which would prevent proper rolling.

It will be noted that the guides W¹, W² are of substantial thickness and need not be tapered off into thin ends so as to pass any great distance between the rolls 20, 21. It is known that in prior art practice where clamps and edge guides are used, they are commonly sharpened so as to pass as far as possible into the spaces between the rolls so as to guide and laterally restrain the strip as much as possible before it enters into the reducing area between the rolls.

Obviously, when the mill is reversed and the strip moves along in the opposite direction, then the portion of the strip at the right will be guided by the member W² so as to wrap that portion more or less about the upper roll 20 as has just been explained in connection with the passage of the strip to the right hand.

Instead of employing the fixed guides W¹, W², it will be better in many instances to employ the guide rollers W³, W⁴ which replace the guides W¹, W², respectively, and operate in the same way to wrap the strip about arcuate portions of the upper roll 20. In order to provide the proper wrapping action of the strip it is only necessary to support the rollers W³, W⁴ at an elevation, as illustrated in Fig. 3.

Passing now for the moment to Fig. 14, it will be seen that the coilers B, C are located with reference to the mill A so that the wrapping of the strip will be about the lower roll 21 instead of the upper roll 20. In this case the operation will be similar to that previously explained only the roll 21 will be the roll which makes the greater contact with the strip, just as before, the roll 20 did in the previously described case.

Other arrangements for obtaining the necessary wrapping of the strip about one or both of the rolls, are shown in Figs. 17, 18 and 19. In the case of the arrangement of Fig. 17, the strip, when traveling in one direction, makes its guiding and flattening contact with the roll 24, and, when traveling in the opposite direction, makes its similar contact with the roll 25, as will be apparent from an inspection of the diagram of this arrangement.

If the roll C be shifted to the left to a position indicated by the diagram of Fig. 18, then it will be true that at all times the flattening action exerted upon the strip will be exercised by the roll 24 and never by the roll 25. The latter roll will serve then solely as a reducing roll while the former roll, the roll 24, will serve both as a reducing roll and as a flattening roll, and this will be true for the travel of the strip in both directions.

Where the plane through the axes of the rolls is oblique to the general direction of travel of the strip, as shown in Fig. 19, then the roll 27 will serve as a flattening and reducing roll as the strip travels to the right and the roll 26 will perform like functions when the strip is traveling to the left, as the parts are viewed in the diagram of Fig. 19. Obviously, when roll 26 is serving the double function of flattening and reducing, the roll 27 will serve the function of reducing only. The reverse action between the rolls will take place when the strip is traveling in the reverse direction.

Of course, in these modified arrangements of Figs. 17, 18 and 19, the portion of the strip which has passed beyond the reducing area will be brought into contact with one of the rolls and this will serve to continue the strip in its flattened and smooth condition rather than otherwise. In other words, any action which the rolls have on the outgoing end of the strip does not interfere with or undo any of the work which has been done previously on the strip in flattening it.

Figure 4:
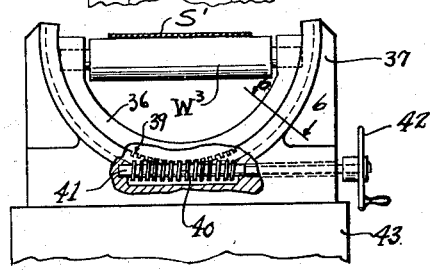
Fig. 4 is an elevation illustrating mechanism by which the guiding and warping rollers of the structure of Fig. 3 may be supported and shifted to bring about proper centerings of the strip.

Now when we come to the warping feature, that is to say, the feature in accordance with which the strip is centered in the pass of the mill or shifted, as may be desired, in a direction lengthwise of the reducing rolls, then, it is preferable to employ the rollers W³, W⁴ in the manner previously described, in order to produce the wrapping action, and, then in addition to the wrapping action, mount the rollers so that they may be rotated about an axis extending in the general direction of the travel of the strip, in some such manner as illustrated in Fig. 4. As there shown, the roller $W^3$ is journaled in an arcuate frame or yoke 36 which is mounted so as to be freely adjusted in a supporting frame 37. As clearly shown in Fig. 6, there is a tongue and groove connection 38 between the engaging portions of the yoke 36 and the support 37 so that the former may be moved freely upon the latter about a given axis of rotation. In this particular instance the yoke 36 is provided on its lower edge with a toothed rack 39. Screw 40 cooperates with the teeth of the rack to oscillate the latter to and fro as may be desired. The screw 40 is formed upon a shaft 41 which is suitably journaled in bearings in the frame 37 and is provided at its outer end with a hand wheel 42. By rotating the latter the yoke 36 and the roller $W^3$ carried by it may be adjusted to produce any desired warping of the strip. Obviously the frame 37 may be firmly set upon a suitable foundation 43.

Figure 8:
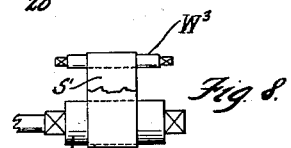
Fig. 8 is a similar view showing the control roller in its horizontal position when no shifting of the strip to the right or the left is desired.

In Fig. 8 the roller $W^3$ is positioned in its central or neutral position. This, in the ordinary installation, would be a horizontal position. When in this position there is no warping action produced upon the strip and no travel lengthwise of the roll 20. Ordinarily it is only when the strip gets to one side or the other of its central position that it becomes necessary to move it lengthwise of the reducing rolls.

Figure 7:
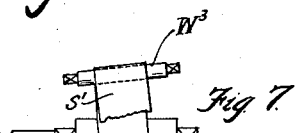
Fig. 7 is an elevational view taken at the feeding in side of the mill rolls and illustrating the control roller shifted so as to guide the strip to the left in the pass.

If the strip, while being rolled, should get too far to the right, then the roller $W^3$ is shifted so as to lower its left hand end and raise its right hand end, as illustrated in Fig. 7. This action is of course brought about by properly rotating the supporting yoke 36. The result of shifting the roller $W^3$ in the way indicated in Fig. 7, is to cause the ingoing strip portion $S^1$ to travel to the left along the reducing rolls 20, 21. Obviously the tilting of the roller $W^3$ may be varied according to the amount and speed of travel required and as the strip approaches its proper position, then the roller $W^3$ may be gradually restored to its normal or intermediate position, the position illustrated in Fig. 8.

Figure 9:
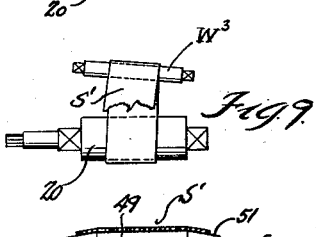
Fig. 9 is a similar view illustrating the parts when the strip is to be shifted to the right.

From what has been said it will be seen that if the strip is too far to the left, then the roller $W^3$ may be shifted to the opposite position, as clearly illustrated in Fig. 9.

Again, the degree of shift and the time during which the same is maintained shifted will depend upon the rate at which the strip returns to its normal position and also just what the operator of the mechanism may consider normal. The camber in the belt or strip or the tendency for it to creep side-wise in the pass will dictate to the operator the exact manipulation in any given case.

Sometimes, in fact very often, a strip may be cambered along its edges. The operator may foresee this situation and by practicing the invention he will be able to move the strip over in the pass to a point beyond the desired position so that when the camber reaches the pass, the off-setting caused by the camber will have been largely equalized by the position just attained in the pass.

Figure 11:
Fig. 11 is a diagram illustrating in a cross sectional view the manner in which the strip may be shifted to the right or the left by simple levers operated by hand or otherwise as desired.

In the cases just described, the rollers $W^3$, $W^4$ are cylindrical throughout and the strip in being centered has been diverted from its normal free path throughout practically the entire width of the strip. Now, in some instances, it may be desirable to warp the strip in this way, but, in other instances, the necessary lateral travel of the strip along the rolls may well be obtained without diverting the strip throughout its entire width. It is possible to bring about the desired action by merely diverting one edge of the strip for a movement along the rolls in one direction and the other edge of the strip for a movement along the rolls in the opposite direction. Thus, in Fig. 11 the ingoing end of the strip $S^1$ is shown raised at the left edge by a hand lever 44 pressing at its inner end against an abutment 45. Of course the left hand end of the lever is to be raised by the hand of the operator or suitable mechanism. When not in use, the lever 44 may rest upon a support 46 at its outer end while its inner end still rests on the abutment 45. A similar lever 47 and associated support 48 may be used to shift the strip in the opposite direction. Here again the parts are shown diagrammatically but it is believed with sufficient clearness to make the operation plain.

Where the parts are to be maintained in a central position at all times, then the edges may be upturned in the manner illustrated in Fig. 5 by means of a special roller $W^5$ which may be held at all times in the central position, that is to say, in a position corresponding to that shown in Fig. 8, which as before stated is ordinarily a horizontal position. The roller $W^5$ has a central cylindrical portion 49 and two outer conical portions 50. The conical portions serve to divert the edges of the strip and the action is such as to prevent the strip traveling laterally out of its central position at least to any considerable extent. There may be to and fro lateral movements but they will be small and within reasonable and unobjectionable limits. If, because of the unevenness of the strip or inaccuracy of machining of the parts, there should be a tendency for the strip to travel in one lateral direction or the other, then the appropriate conical surface 50 will come into play and bring the strip back to its normal position. This action will continue as the departures from normal occur and will thus provide proper centering for all practical purposes.

Instead of diverting the edges of the strip in a direction away from the axis of the warping roller, the latter may be constructed in the manner indicated by the roller $W^6$ of Fig. 10 so as to cause the outer edges of the strip to be diverted toward the axis of the roller. The action in this case will be similar to that where the roller $W^5$ is employed. Because of the similar action it seems unnecessary to repeat in detail how the strip would be caused to travel to and fro laterally and maintained most of the time in its centered position. The roller $W^6$ has a central cylindrical portion 49 the same as roller $W^5$ and at its ends conical surfaces 51 which are similar to the surfaces 50 of roller $W^5$ but oppositely inclined, all of which will be clear from a simple inspection of Figs. 5 and 10 of the drawings.

Viewed in another way, the center of the strip in the arrangement of Fig. 10, runs over a pulley crowned at the center, thus deflecting the longitudinal center out of its plane while the edges remain in the horizontal plane of the pass of the mill, and the strip will be held by the centrally crowned pulley.

In the case of the rollers $W^5$ and $W^6$, wherein both edges of the strip are subject to the diverting action, the centralizing action is automatic in that if the strip moves over to one side, one edge becomes excessively depressed out of its plane and the other edge tends to return to its plane. The result is that the more highly deflected edge returns to a balance with the less highly stressed edge.

Figure 12:
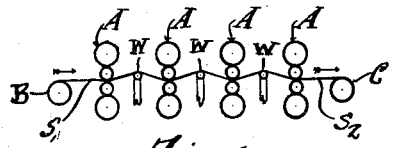
Fig. 12 illustrates diagrammatically a continuous mill having three warping rollers alternating with four mill stands.

Obviously the warping rollers might be used in association with a series of stands in a continuous rolling mill. Such an arrangement is illustrated in Fig. 12 where there are four stands of mill rolls A and intervening warping rollers W. The coiling and uncoiling of the strip is provided through the agency of coilers B and C just as before. In this instance the warping rollers W are the same as the rollers $W^3$ and $W^4$ and operate in the same way.

Still another arrangement is illustrated in Fig. 13 where there are also four stands of rolling mill rolls A associated with a feeding coiler B and a receiving coiler C. This arrangement is also for a continuous mill. Here two warping rollers W are shown. These rollers, as before, are like the rollers $W^3$ and $W^4$ and are mounted so as to be used in the same way. It will be noted, however, that in this arrangement the passes of the first, third and fourth mills, numbering from the left, are practically in the same level while that of the second mill is elevated with reference to the others. Likewise the warping rollers W are elevated with reference to the others. This is also true of the coiler C. Now because of the alternate elevations and depressions of the surfaces over which the strip passes or from which it is delivered, the wrapping feature of the invention previously fully described is present. In other words, in this particular arrangement, the staggering of the mill passes in an up and down direction bringing about the desired wrapping of the strip so as to feed it into the different passes in good flat condition without the use of clamps and guides. Although the warping rollers W are capable of producing a centering action in the manner previously explained, they, nevertheless, also perform the wrapping function as in the other figures. In this case one warping roller W is shown on the entering side of the first stand of rolls, and the second warping roller is located between the third and fourth stands of rolls. In a continuous mill the most important place to center the strip is before it enters the first pass. This, then, is done by the roller W nearest the feeding in coiler B. If everything in the mill be properly adjusted this might be enough. But often there is something wrong and a further centering is necessary. This, then, can be done, in the arrangement shown, by the second warping roller W, namely, that nearest the receiving coiler C. Indeed, the centering means may be variously placed and if desired a centering roller W might be associated with each stand and used as a means of correction. What is shown makes clear the possible arrangements for this purpose. An important feature brought out by the arrangement in Fig. 13 is that of providing the necessary wrapping advantage by vertically offsetting or staggering the rolls of the successive stands of the mill.

In addition to the above features, I have also provided a novel bearing for the coilers B, C, a sort of box bearing, arranged so that a quick change of coils may be made at any time in connection with a reversing mill of the type illustrated herein. As shown more particularly in Figs. 14 and 16, each coiler includes a base 52 which carries pedestals 53 for the bearings of the coiler shaft 54. The latter carries at its center the reel 55 upon which the strip S is wound or is to be wound, suitable holding mechanism being employed to secure the end of the strip to the reel, as indicated at 56. Each pedestal 53 is bifurcated so as to provide two fixed supports 57 for each set of bearing rollers 58 of which, in the present instance, there are three. The rollers 58 are provided with journals which cooperate with the bearings in the supports 57. The axes of the rollers 58 are parallel to each other and located at a fixed distance from the axis of the shaft 54. They are also equally spaced about the cylindrical surface in which they lie. In the present instance two of the rollers 58 are diametrically opposite each other, and the third roller occupies an intermediate position. This provides an open bearing having bearing rollers journaled in a fixed support.

With this arrangement it is possible to move the shaft 54 into and out of its operating position. When in its operating position, its journaled surfaces engage the rollers 58 of the respective bearings. Because of the wide space left between the extreme rollers 58, ample room is provided for withdrawing and replacing the shaft. In order to hold the shaft in its final position, each pedestal 53 is provided with a movable roller support 59, a sort of swing gate, which carries the bearing roller 60. The movable support or gate 59 is pivoted to the pedestal 57 at 61 and its free end is movable from a downward open position, illustrated at the left in Fig. 14, to an upper closed or locking position, illustrated at the right in the same figure. As clearly shown at the right, the bearing roller 60 comes into operative engagement with the shaft 54 when the movable support 59 is brought into its closed position.

The free end of the movable member 59 is slotted, as indicated at 62, so as to receive the end of a retaining rod 63 which in turn is journaled in supports 64 formed at the upper ends of the pedestals 53. The outer end of the rod is in each instance threaded for the reception of a nut 65. The latter is provided with a hand wheel so that it may be easily turned up. When the rod 63 passes into the slot 62, the nut 65 may be turned to tighten the parts and press the bearing roller 60 more firmly into engagement with the enclosed shaft 54.

When operating a mill of the reversing type, such as shown in Fig. 14, a filled reel of the finished strip may be readily withdrawn with its shaft 54 and a new reel put in place as a substitute for the one removed. Such an additional reel 66, mounted upon its shaft 54 and containing a coil of strip S, is shown in Fig. 14 mounted upon a block 67 in readiness to be lifted by a crane or otherwise and brought into position in the bearings of one of the coilers. Likewise the coil of finished strip is removed with its shaft from the opposite pedestal and an empty reel set into position. Obviously, various arrangements may be used for quickly making this change as would be necessary where a strip had been completed and it was necessary to supply a new coil of untreated strip. Ordinarily the entire change ought to be fully completed in a very few minutes, say two or three. This is in decided contrast to previous practice where about fifteen minutes are taken up in removing the finished strip from the drum of a fixed reel.

Preferably the working of the reversing mill is such that an odd number of passes is used and the strip is finished on the outgoing side of the mill. In that case, a crane carries the coiled finished strip away, perhaps two hundred feet, down the mill where another operation is going on. Another crane lifts the empty reel from in front of the mill to the bearing back of the mill, that is to say, to the bearing on the outgoing side of the mill. Then the same crane lifts the coil 66 over into the reel bearings. This makes a very quick change.

For details of the bearings for the coiler shafts, reference should be had to Figs. 22, 23 and 24. As there shown the journals of each of the rollers 58 are positioned in each instance in an inner roller bearing ring 70 and keyed or otherwise firmly secured to the same so that the two will rotate together as a single unit. In like manner an outer roller bearing ring 71 is secured in the associated bearing member 57. Between the inner and outer roller bearing members are the bearing rollers 72. The latter may be maintained in place in any suitable way. In other words, there are many types of roller bearings that may be used as herein provided. What are shown are merely typical.

It will be obvious that many ways may be utilized in the mounting of various control rollers $W^3$, $W^4$, $W^5$, $W^6$ and the like instead of the rocking mounting of Fig. 4. As illustrative of such, attention is called to the mountings of Figs. 20 and 21. As there clearly shown, the fixed base 73 is grooved on its upper side for the lengthwise to and fro travel of the yoke or frame 74 which carries the control roller, shown as the roller $W^5$ in the case of Fig. 20, and as the roller $W^6$ in the case of Fig. 21. The under side of the frame 74 is toothed so as to provide a rack 75 for cooperation with the worm 76 journaled in suitable bearings in the base 73 and operated by a hand wheel 77 to shift the roller $W^5$ or $W^6$ lengthwise of its axis and so transversely of the strip being fed into the mill. These rollers are positioned as before indicated. For assembly purpose the inner end of the worm shaft is journaled in a sleeve bearing 78 and the worm is held in adjusted position by a screw 79 threaded into the sleeve 78.

Still another way for providing the necessary warp to the strip is illustrated in Figs. 25, 26 and 27. In this arrangement the mill, coilers and control rollers $W^3$, $W^4$ are all arranged in the same way as in Fig. 3 but the rollers $W^3$, $W^4$ are mounted to oscillate in a horizontal plane or in a plane approaching the horizontal. This movement of the rollers about a vertical axis will, when arranged relative to the other parts as shown in Fig. 3, causes a warping of the strip on the feeding side. As shown in Fig. 25, the strip is traveling from coiler B on to coiler C. At this time, it is roller $W^3$ that controls the warping and wrapping feed. Roller $W^4$ comes into service when the strip travel is in the opposite direction.

To give the necessary oscillatory movement to the rollers $W^3$, $W^4$, different arrangements of mechanism might be employed. The arrangement shown, particularly in Figs. 26 and 27 is therefore typical and suggestive. As there shown the roller $W^3$ is journaled in a yoke or frame 80 which has a central boss or hub 81 in which the vertical shaft 82 is secured by a key 83 or in some such suitable manner. The shaft 82 is set in a thrust bearing in the supporting block 84. In order to rotate the shaft 82 and the yoke 80 which it carries, a worm wheel 85 is secured to the shaft and is free to rotate in a recess 86 in block or base 84. A worm 87 suitably journaled in bearings in the block and rotated by a hand wheel 88, is employed to oscillate the roller $W^3$ about the vertical axis of the pivot shaft 82. For assembly purposes one end of the worm shaft is journaled in a sleeve bearing 89 and the worm is held in adjusted position by a screw 90 threaded into the bearing 89.

It will be clear to those skilled in the art that in centering the strip, automatic devices might be used to advantage to operate the tilting mechanisms of the various embodiments of the invention whenever the strip runs beyond a lateral limit in either direction. Actuating fingers operated by engagement of the strip with the fingers might be used with suitable motor mechanism of various types, electric, pneumatic, hydraulic, or otherwise. Optical means, like the so called electric eye, could be used to good advantage to control the motor mechanism in response to varying positions of the strip.

It will also be clear that the extent of wrap of the strip about the roll may vary considerably, ranging from a very slight wrap to that enclosing as much as a quarter of the circumference. A wrap such as that illustrated by the dimension 35 in Fig. 2 is a fair representative of what may be employed in practice. Figs. 17 and 18 illustrate 90 degree flattening wraps.

It is possible that in prior belt rolling there may have been a wrap of belt around a roll but this occurred on the delivery or outgoing side of the mill rolls and therefore was of no value in flattening the strip on the ingoing side. To be effective for my purpose the wrapping must be on the ingoing side of the pass. Wrapping on the outgoing side does no good nor harm. But where the mill is a reversing mill, the rolls and reels are set so as to give the guiding wrap on both sides of the mill, at one time when the strip is fed in one direction and at the other time when the strip is fed in the other direction. Although the amount of contact between the strip and the roll to provide the necessary wrap need not be great, it should, nevertheless, be greater on the one roll than on the other roll and should remain greater on the one roll than on the other throughout the particular rolling of the strip. There should be no such thing as the wrap swinging over from one roll to the other during the rolling operation, because if a buckle should go through the pass at the instant of no warping, a defect in the strip would occur.

It is important in practicing the wrapping feature of the invention to combine wrapping with tension in the strip. This is a point which I wish to emphasize.

In the illustrations the extent of warping and wrapping is exaggerated considerably in order to make the same clear. But in any event it is beyond anything that has been done heretofore in the prior art insofar as I am advised. The tension combining with the warping and wrapping seems absolutely new with me.

The amount of warp that may be needed in any case will depend somewhat upon the strip being rolled and rolling conditions. Tension rolled strip is usually straighter than strip rolled without tension, also long strips usually have less camber in a unit length than do short strips. In rolling under tension, quite a small amount of warp in the long strip being rolled, is usually found to be sufficient.

The mechanical details for the drives of the portable shafts on which the strip is coiled have not been shown. It will be understood, however, that these shafts may be turned by any suitable drive such as electric motors acting through reducing speed gears, the torque being applied through a spindle and a crab coupling as is the usual practice in mill work.

A decided advantage resulting from controlling the strip in the way pointed out lies in the fact that, if a strip can be maintained at the central position of the pass, the stresses are most nearly balanced on the two sides of the central longitudinal line of the strip. This balancing of the stresses insures more uniform reductions on the two sides of the central longitudinal line of the strip. It also insures a more uniform wearing of the roll surfaces and the roll necks and roll bearings.

Perhaps as great an advantage as any lies in the increased width of product that can be rolled on a given faced roll, due to more exact control of the position in the pass. Other secondary advantages occur such as longer life of rolls and bearings, and less time lost in changing rolls. By balancing the stresses the strip is maintained in the center of the roll. This distributes equal stresses to the two necks, bearings, screws and housings. These parts being uniform in material and size on the two sides of the center line of the mill, the deflections of the parts are uniform. Everything therefore tends to uniformity, and that is effective in a higher quality and quantity of strip.

As before indicated, the portion of the strip on the ingoing side of the mill is appreciably tensioned by some form of hold back means applied at the feeding coiler or on the feeding coiler side of the warping and wrapping rollers. This hold back means may be a pair of pinch blocks or may be a pair of pinch rollers or may in fact be another set of working rolls of a previous rolling operation. The particular hold back means which may be used to produce the tension in the strip is not important. Any suitable means may be employed. Those previously mentioned are therefore only illustrative.

In addition to what has been said heretofore about centering the strip, it should be noted that all hot rolled strip has more or less cambered edges. These may result from many causes. The original billet may have been cambered; some of the hot mill rolls may have been slightly out of round or out of parallel; or indeed the cold rolls themselves may be out of round or out of parallel. In fact, rolls may be parallel when the strip is centrally located in the pass, but when the piece in the pass is moved over to one side, the stresses in the mill are thereby increased very greatly on one side and decreased proportionately on the other side, causing some elongation of the mill parts in the overstressed side and a shrinkage of the understressed parts. These motions due to the change of stresses are sufficient to disarrange the parallelism of the rolls and to affect the relative thicknesses of the two sides of the strip.

The method and mechanism herein disclosed makes it possible to hold a strip, even though it is cambered, to a very closely limited central position as it cannot be by the usual prior art methods.

In one rolling, the upturn of the edge of the strip amounted to three-quarters (¾) of an inch at a distance of eighteen (18) inches from the pass. The rolls of the mill were ten (10) inches in diameter and the width of the piece was about seven (7) inches, and the thickness about three hundredths (.030) of an inch. There was such a combination of inequalities that the strip when unguided did travel to one edge of the rolls in a travel of the strip of about twelve (12) feet when not warped, yet with the guiding means herein disclosed and the warping not to exceed the amount defined above, the piece was maintained easily within a total variation of one-eighth (⅛) of an inch laterally in the pass. In this case the regulation was sufficiently close to the center to give the equality of stresses desired to accomplish good rolling.

The action which results from diverting the edge of the strip, in the case of the rolling pass, is to give a very slight spiral wrap of the edge of the strip about one of the rolls. This extremely slight spiral has a powerful lateral pushing effect against the rest of the material in the pass, without exerting a pushing effect of the roll against the bearing of the roll. The spiral edge entering the pass appears to have the power of a screw in which the pitch is very slight.

But because the angularity of the spiral is slight, the speed at which the belt or strip is moved over is very slow as compared with the longitudinal speed of the piece through the pass. A wedge action of the material seems to be, therefore, the basis of the powerful action that slowly but surely moves the strip over.

In illustrating the warping devices, I have presented devices which move the strip vertically but recognize that a horizontal shifting of the warping element, as for example a warping roller, will warp the strip equally well.

It will be noted that the deflecting of the edges of the strip in the manner so clearly illustrated in Figs. 5 and 10, may be termed "dishing" the edges of the strip since the same provides a concavity not unlike that of a dish.

Obviously in carrying out my invention some changes in the steps of the method and in the details of the mechanism may be made without departing from the spirit and scope of the invention. I, therefore, do not wish to be unduly limited in respect to the various matters recited but aim to cover by the terms of the appended claims all those changes which rightly come within the scope of the invention.

I claim:

1. The method of feeding metal strip into a rolling mill pass which consists in tensioning the strip on the feeding in side of the pass after the strip has been gripped by the rolls, directing the strip into the mill in a direction oblique to the plane of the roll axes so as to cause the strip to wrap about a portion of one of the rolls and thus be fed flat through the pass, and centering the strip in the pass by shifting the strip laterally of itself by deflecting one of the edges of the strip from the plane in which the strip normally freely travels, all of said deflecting being done on the feeding in side of the pass.

2. The method of feeding metal strip into a rolling mill pass which comprises tensioning the strip on the feeding in side of the pass after the strip has been gripped by the rolls, and while so tensioning the same centering the strip in the pass as may be necessary by diverting one of the edges of the tensioned portion of the strip from the normal free plane of travel of the strip whereby the diverted edge of the strip will engage one of said rolls along a spiral path as the roll rotates and the strip will thereupon in any given case creep lengthwise of the rolls away from the edge which is so diverted.

3. The method of feeding metal strip into a rolling mill pass which comprises tensioning the strip on the feeding in side of the pass after the strip has been engaged by the rolls, and while so tensioning the strip causing it to travel lengthwise of the rolls by diverting one edge of the tensioned portion of the strip on the feeding in side of the pass adjacent thereto out of the normal free traveling plane of the strip.

4. The method of feeding metal strip into a rolling mill pass which comprises tensioning the strip on the feeding in side of the pass after the strip has been engaged by the rolls, and while so tensioning the strip deflecting out of the plane of the strip that edge of the tensioned strip farthest from the longitudinal center line of the mill to produce a travel of the strip along the rolls to equalize the distances from said center line to the edges of the strip.

5. The method of keeping a strip centrally located in the pass of a rolling mill while rolling, which consists in tensioning the strip by pulling upon it in a direction away from the mill rolls on the feeding in side thereof and simultaneously therewith dishing the edges of the strip out of their plane and dishing more heavily that edge which is farthest from the center line of the pass.

6. The method of centralizing a strip while rolling in the pass of a rolling mill, which consists in tensioning the strip by pulling upon it in a direction away from the mill rolls on the feeding in side thereof and simultaneously therewith deflecting the edges of the strip, and deflecting to a greater degree that edge which is farthest from the longitudinal center line of the piece in the pass.

7. The method of feeding metal strip into a rolling mill pass which consists in tensioning the strip on the feeding in side of the pass after the strip has been gripped by the rolls, directing the strip into the pass over an arcuate portion of the rolling surface of one of the rolls and thus feeding the strip flatwise through the pass where the reduction takes place, and centering the strip in the pass by deflecting the edges of the strip at will from the plane in which the strip normally freely travels.

8. In a rolling mill plant, the combination of a pair of reducing rolls, means for tensioning the work on the feeding in side of said rolls after the work has been gripped by the rolls, a guide roller in the path of travel of the tensioned work passing between said rolls, and means for rocking said roller in a plane transverse of the general direction of travel of the work to shift the work out of its normal free plane under said tension and thereby cause the same to shift itself longitudinally of said reducing rolls during its continued forward travel.

9. In a rolling mill plant, the combination of a pair of reducing rolls, means for tensioning the work on the feeding in side of said rolls after the work has been gripped by the rolls, a guide roller for the work before the rolls in the path of travel of the tensioned work on its way to said rolls, a supporting frame in which said roller is journaled, and means for shifting said frame to vary the position of said roller in a plane transverse of the general direction of travel of the work to shift the work out of its normal free plane under said tension and thereby cause the work to shift itself lengthwise of said reducing rolls during its continued forward travel.

10. A rolling mill plant including a plurality of mill stands arranged in tandem for the continuous passage of strip, tensioning means for pulling on the strip at certain passes, the tension applied in each instance being of appreciable value relative to the compression at the pass which the strip is about to enter, and warping means located on the intake side of certain of said stands, said warping means in each instance operating upon the strip by shifting portions of the same out of the normal free plane of the strip to cause a lateral shifting of the strip to properly position the same relative to the mill pass it is about to enter.

11. A rolling mill plant including a plurality of mill stands arranged in tandem for the continuous passage of strip, warping means located on the intake side of certain of said stands, said means in each instance operating upon the strip by shifting portions of the same out of the normal free plane of the strip to cause a lateral shifting of the strip to properly position the same relative to the mill pass it is about to enter, said warping means also being positioned out of the normal path of travel of the strip between said stands and operative to wrap the same about a portion of one of the reducing rolls about to act upon the strip whereby the strip is presented in a transversely flat condition to the reducing area between said reducing rolls.

12. A rolling mill plant including a plurality of mill stands arranged in tandem for the continuous passage of strip, tensioning means for drawing on the strip to stretch roll it at certain passes, and warping means located on the intake side of one of the stands, said means in each instance operating upon a tensioned portion of the strip by warping the strip to cause a lateral shifting of the strip along the reducing rolls of that particular stand to properly position the same relative to the mill pass it is about to enter.

13. A rolling mill plant including a plurality of mill stands arranged in tandem for the continuous passage of strip, tensioning means for drawing on the strip to stretch roll it at certain passes, and warping means located on the intake side of certain of said stands, said means in each instance operating upon the strip by shifting portions of the same out of the normal free plane of the strip to cause a lateral shifting of the strip to properly position the same relative to the mill pass it is about to enter, said warping means also being positioned out of the normal path of travel of the strip between said stands and operative to wrap the same about a portion of one of the reducing rolls about to act upon the strip whereby the strip is presented in a transversely flat condition to the reducing area between said reducing rolls.

14. A rolling mill plant including a plurality of mill stands all arranged in tandem with certain of said stands having their passes alternately differently elevated and others of said stands having their passes at the same elevation, tensioning means for pulling on the strip at certain passes, the tension applied in each instance being of appreciable value relative to the compression at the pass which the strip is about to enter, and warping means associated with said other stands on the intake side of certain of them, said warping means in each instance operating upon the strip by shifting portions of the same out of the normal free plane of the strip to cause a lateral shifting of the strip to properly position the same relative to the mill pass it is about to enter.

15. A rolling mill plant including a plurality of mill stands all arranged in tandem with certain of said stands having their passes alternately differently elevated and others of said stands having their passes at the same elevation, and warping means associated with said other stands on the intake side of certain of them, said means also being positioned out of the normal path of travel of the strip between said other stands and operative to wrap the same about a portion of one of the reducing rolls about to act upon the strip whereby the strip is presented in a transversely flat condition to the reducing area between said reducing rolls.

16. A rolling mill plant including a plurality of mill stands all arranged in tandem with certain of said stands having their passes alternately differently elevated and others of said stands having their passes at the same elevation, tensioning means for pulling on the strip at certain passes, the tension applied in each instance being of appreciable value relative to the compression at the pass which the strip is about to enter, warping means associated with said other stands on the intake side of certain of them, said warping means in each instance operating upon the strip by shifting portions of the same out of the normal free plane of the strip to cause a lateral shifting of the strip to properly position the same relative to the mill pass it is about to enter, and tensioning means for drawing on the strip to stretch roll it at said differently elevated and other stands.

17. A rolling mill plant including a plurality of mill stands all arranged in tandem with certain of said stands having their passes alternately differently elevated and others of said stands having their passes at the same elevation, warping means associated with said other stands on the intake side of certain of them, said means also being positioned out of the normal path of travel of the strip between said other stands and operative to wrap the same about a portion of one of the reducing rolls about to act upon the strip whereby the strip is presented in a transversely flat condition to the reducing area between said reducing rolls, and tensioning means for drawing on the strip to stretch roll it at said differently elevated and other stands.

18. The method of clearing flat flexible metal pieces, such as strip and plate, of irregularities, such as wrinkles, buckles and the like, which method consists in feeding the piece throughout practically its entire length into the pass of a mill in wrapping engagement with an arcuate portion of the surface of one of the mill rolls, said arcuate portion being adjacent to the pass, and simultaneously pulling the piece against the roll with sufficient force to draw out the metal to remove the irregularities from that portion of the piece which is in engagement with said roll, and thereupon while maintaining the metal in said drawn out condition, subjecting the same to the compressive action of the rolls, whereby the piece is set with the irregularities removed.

19. The method of clearing flat flexible metal pieces, such as strip and plate, of irregularities, such as wrinkles, buckles and the like, which method consists in feeding the piece throughout practically its entire length into the pass of a mill over a portion of one of the mill rolls, the feeding of the piece up to the engaged roll being along a plane tangential to the surface of said engaged roll and oblique to the plane of the axes of said rolls for all positions of the piece being fed, and said feeding being accompanied by a pulling of the piece against said roll surface with sufficient force to draw out the metal to remove the irregularities from that portion of the piece which is in engagement with said roll surface, and thereupon while maintaining the metal in said drawn out condition, subjecting the same to the compressive action of the rolls, whereby the piece is set with the irregularities removed.

20. The method of freeing flat flexible metal pieces, such as strip and plate, of irregularities, such as buckles and the like, while being rolled in a mill, which method consists in tensioning said piece with such force against the surface of one of the working rolls of the mill as to completely flatten out the irregularities of the piece against the surface of the roll as that portion of the piece which has been freed is about to enter the pass of the mill where the pressure of the roll progressively sets the strip in a flattened condition.

WILLIAM C. CORYELL.